US006085087A

United States Patent [19]

Hori et al.

[11] Patent Number: 6,085,087

[45] **Date of Patent: *Jul. 4, 2000**

[54] ROAMING CONTROL METHOD FOR DIGITAL MOBILE TELEPHONE

[75] Inventors: Hiroyuki Hori, Machida; Takashi Masuda, Yokohama; Gorou Serizawa, Kawasaki, all of Japan

[73] Assignee: Kabushiki Kaisha Kenwood, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/699,443

[22] Filed: Aug. 19, 1996

[30] Foreign Application Priority Data

Aug. 29, 1995 [JP] Japan .................................... 7-243747

[51] Int. Cl.[7] .................................................. H04Q 7/24

[52] U.S. Cl. .................................................. 455/434

[58] Field of Search .................................... 455/432, 434, 455/436, 422, 511, 552, 522, 450, 433, 446, 449

[56] References Cited

U.S. PATENT DOCUMENTS

| | | | |
|---|---|---|---|
| 5,159,625 | 10/1992 | Zicker | 455/419 |
| 5,239,678 | 8/1993 | Grube et al. | 455/512 |
| 5,404,355 | 4/1995 | Raith | 455/343 |
| 5,418,839 | 5/1995 | Knuth et al. | 455/464 |
| 5,442,806 | 8/1995 | Barber et al. | 455/551 |
| 5,454,027 | 9/1995 | Kennedy et al. | 455/432 |
| 5,475,862 | 12/1995 | Sawyer | 455/435 |
| 5,546,444 | 8/1996 | Roach, Jr. et al. | 455/426 |
| 5,586,338 | 12/1996 | Lynch et al. | 455/434 |
| 5,613,204 | 3/1997 | Haberman et al. | 455/434 |
| 5,673,260 | 9/1997 | Umeda et al. | 455/436 |
| 5,809,416 | 9/1998 | Pinault et al. | 455/422 |
| 5,832,368 | 11/1998 | Nakano et al. | 455/450 |
| 5,873,047 | 2/1999 | Nakano et al. | 455/561 |
| 5,930,712 | 7/1999 | Byrne et al. | 455/437 |

FOREIGN PATENT DOCUMENTS 0 603 049 A1 6/1994 European Pat. Off. .

OTHER PUBLICATIONS

M. Mouly et al., GSM System for Mobile Communications, 1992, Europe Media Duplication S.A., Lassay–Les–Chateaux XP002101435, 23592, pp. 446–451 (month needed) 1992.

European Search Report (Date needed) May 19, 1999.

*Primary Examiner*—William G. Trost
*Assistant Examiner*—Jean A. Gelin
*Attorney, Agent, or Firm*—Eric J. Robinson; Nixon Peabody LLP

[57] ABSTRACT

A roaming control method for a digital mobile telephone is provided which is capable of entering a call reception state in a shortest time even if different carriers (providers) in the same frequency band are used for mobile telephone services. A roaming control method for a digital mobile telephone in a call reception control scheme at a home network and a roaming network, includes the steps of: activating a perch channel having a level of a reception radio wave larger than a predetermined level to receive broadcast information; judging whether a network number contained in the received broadcast information coincides with a home network number, and if not coincident; checking whether a roaming network number preloaded in the digital mobile telephone coincides with the network number contained in the received broadcast information, and if coincident; and receiving a call via the perch channel.

2 Claims, 5 Drawing Sheets

ROAMING CONTROL METHOD FOR DIGITAL MOBILE TELEPHONE

BACKGROUND OF THE INVENTION

1. Field of the Invention

The present invention relates to a roaming control method for a digital mobile telephone, and more particularly to a roaming control method for a digital mobile telephone capable of providing a highly efficient roaming control.

2. Related Background Art

A mobile telephone roaming control method for a digital mobile telephone system is stipulated in the digital mobile telephone system standard specification (STD-27) of Research and Development Center for Radio Systems, a corporate judicial person. STD-27 considers a call reception at a home network as an important function. Therefore, if the home network and a roaming network use the same frequency band and a mobile telephone is in a service area of the roaming network, the mobile telephone with its power turned on performs a perch scan of the home network and generates a perch channel table.

In this description, the home network is a network served by a mobile telephone unit distributor and the roaming network is a network which is different from the home network, but registered at the mobile telephone unit as the network accessible by the mobile telephone unit.

The mobile telephone sequentially activates (synchronizes with) a perch channel starting from the start channel of the perch channel table (storing channels in the order of higher radio wave level) to receive broadcast information. Since the mobile telephone is in the service area of the roaming network, the received network number information contains a network number associated with a roaming network ID. In this case, although this network number allows a call reception, since the network number in the broadcast information is different from that of the home network, the mobile telephone judges that a call reception is impossible and activates the next perch channel. However, since the home network does not provide any service in the area where the mobile telephone is (because the carrier for the home network does not provide a service in the area serviced by the roaming carrier), all receivable perch channels are judged that they cannot receive a call. After the mobile telephone judges that a call reception is impossible in the home network, it performs a perch scan in the roaming network to receive a call in the roaming network and generate a perch channel table. This perch channel table is in many cases the same as the perch channel table obtained when scanning the perch of the home network. Next, the mobile telephone activates the start perch channel of the perch channel table and receives the broadcast information. Since the network number contained in the received broadcast information coincides with that of the roaming network, the mobile telephone judges that the channel can receive the call so that it activates the call reception channel to receive the call.

As above, in the conventional roaming control method for a digital mobile telephone, the same perch scan is required to be performed twice in order for the mobile telephone to enter the call reception state, and the wasteful channel activations are required.

SUMMARY OF THE INVENTION

It is an object of the present invention to provide a roaming control method for a digital mobile telephone capable of entering a call reception state in a shortest time even if different carriers (providers) in the same frequency band are used for mobile telephone services.

In order to solve the above problems, the invention provides a roaming control method for a digital mobile telephone in a call reception control scheme at a home network and a roaming network, which comprises the steps of: activating a perch channel having a level of a reception radio wave larger than a predetermined level to receive broadcast information; judging whether a network number contained in the received broadcast information coincides with a home network number, and if not coincident; checking whether a roaming network number preloaded in the digital mobile telephone coincides with the network number contained in the received broadcast information, and if coincident; and receiving a call via the perch channel.

Activation of a perch channel having a level of a reception radio wave larger than the predetermined level is performed in the order of higher level of the reception radio wave.

BRIEF DESCRIPTION OF THE DRAWINGS

FIG. 4, which comprises

DETAILED DESCRIPTION OF THE PREFERRED EMBODIMENTS

An embodiment of the invention will be described with reference to the accompanying drawings.

Figure 1:
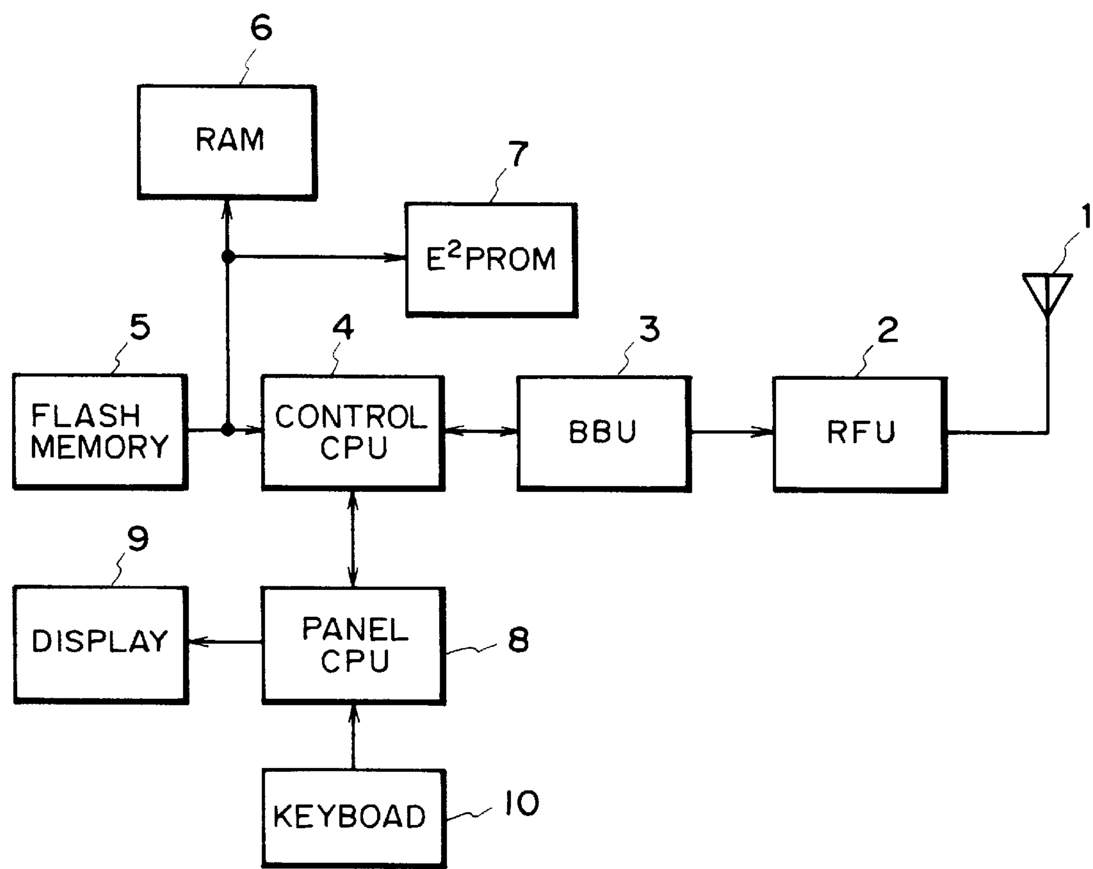
FIG. 1 is a block diagram of a digital mobile telephone using a roaming control method according to an embodiment of the invention.

FIG. 1 is a block diagram of a digital mobile telephone using a roaming control method according to an embodiment of the invention.

A radio signal received via an antenna 1 is converted into an RF signal by an RF unit (RFU) 2 and sent to a baseband unit (BBU) 3 which performs a predetermined digital signal process. An output signal of the baseband unit 3 is supplied to a control CPU 4 which performs a roaming control operation or a protocol control of the embodiment to be described later, in accordance with a program sequence stored in a flash memory 5. A RAM 6 is used for a working area when a roaming control program is executed. An EEPROM 7 includes roaming mode management registers for storing various information for the roaming control. A panel CPU 8 receives an instruction from a user entered from a keyboard 10 and notifies the control CPU 4 of it. For example, a roaming mode switching instruction is notified to the control CPU 4. On a display 9, the operation information, the apparatus operation state, and the like are displayed.

According to RCR STD-27 stipulating a roaming control method for digital mobile telephones, a network number priority type is fundamental. In this embodiment, network number parallel judgement is possible so that high speed roaming can be performed.

Since perch scan is managed independently from a network number, by without putting a perch scan control flag in EEPROM, only one perch scan is sufficient even if different carriers are mixed in the same frequency band.

The operation of the embodiment will be further detailed. When a power is turned on, the mobile telephone starts a home network perch scan. After completion of the perch scan, a perch table of perch channels having a level larger than a threshold value is generated in the order of higher intensity of a reception radio wave. The mobile telephone activates (synchronizes with) the start channel of the perch table and receives broadcast information. Next, it is checked whether or not the network number contained in the broadcast information coincides with the home network number. If the network numbers do not coincide, it is checked whether the network number of a roaming network coincides with the network number contained in the broadcast information. In this case, the network number of a roaming network coincides with the network number contained in the broadcast information. The mobile telephone judges therefore that the perch channel can receive a call, and activates the perch channel to enter a call reception state.

In a conventional technique, the perch scan and the network number are always managed in one-to-one correspondence. Therefore, even if the perch channel tables of the home network and the roaming network are the same, these networks are managed by different algorithms. In the embodiment of the invention, however, the home network and the roaming network are managed independently from each other. Specifically, after the perch scan is performed and the start channel is activated, it is checked at a time whether there is any coincident network number among all network numbers of the home network, roaming network, and the like, registered in the ID information of a mobile telephone capable of call reception. This independent management can completely eliminate wasteful operation.

Figure 2:
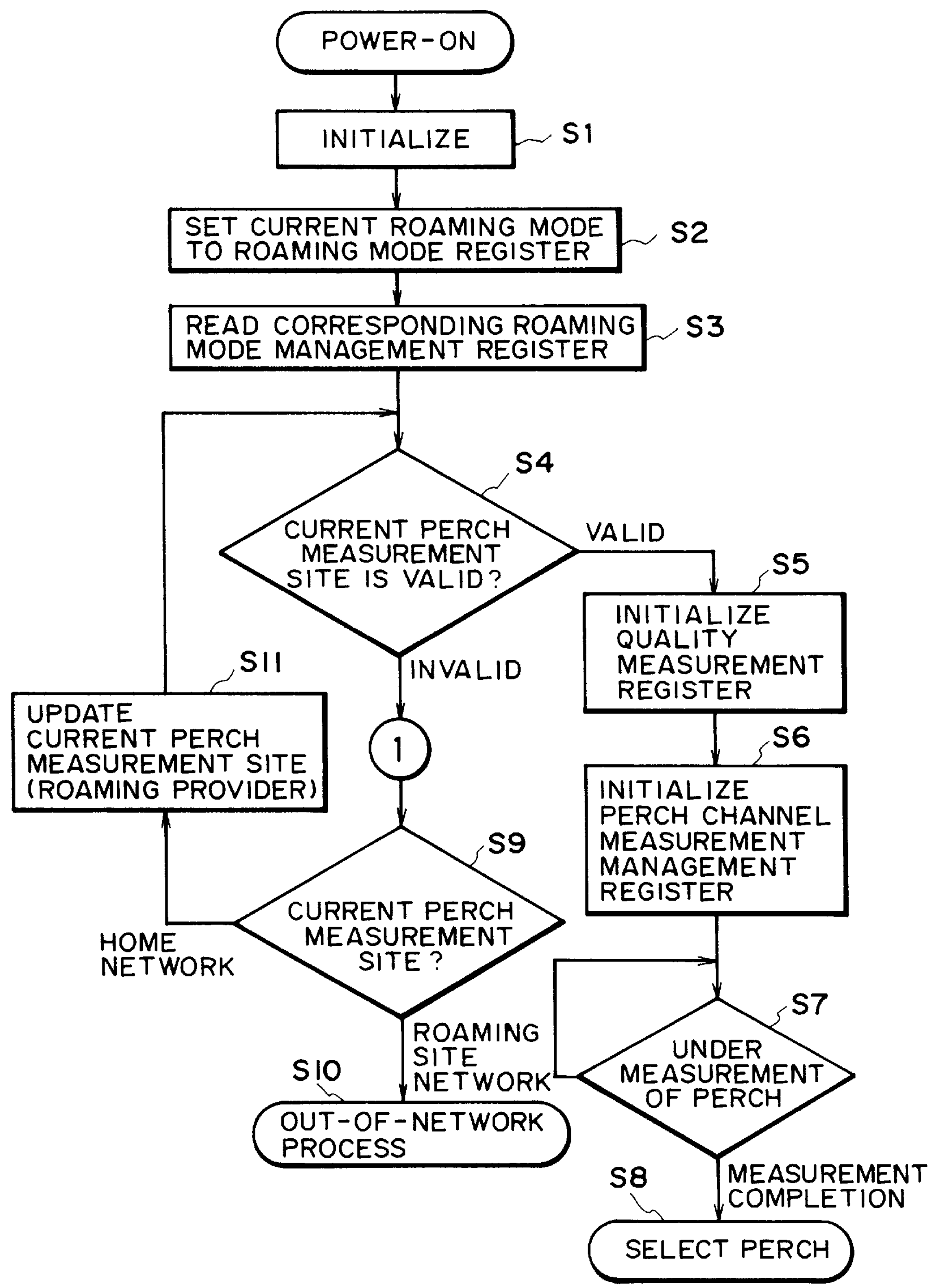
FIG. 2 is a flow chart illustrating the operation procedure of the embodiment.

The operation procedure of the embodiment will be described with reference to FIG. 2.

After the power is turned on, the mobile telephone is initialized (Step S1), a current roaming mode is set to a roaming mode register (Step S2), and a corresponding roaming mode management register is read (from the roaming mode register having 0-the to 7-the modes) to determine a roaming operation scheme (Step S3). The roaming mode register stores the values of 0-th to 7-th roaming modes stipulated by RCR. Next, it is judged whether a current perch measurement is valid or not (Step S4). If valid, a quality measurement register is initialized (Step S5), and then initialized is a perch channel measurement management register containing perch channel information which determines a perch scan scheme (Step S6). It is then checked whether a perch is being measured (Step S7), and after the completion of measurement, a perch table is generated and a perch selection operation starts (Step S8).

If it is judged at Step S4 that the current perch measurement is not valid, it is judged whether the current perch measurement is the roaming network or the home network (Step S9). If it is judged as the roaming network, an out-of-network process starts (Step S10), whereas if it is judged as the home network, the current perch measurement (roaming provider) is updated (Step S11) to return to the process of Step S2.

Figure 3:
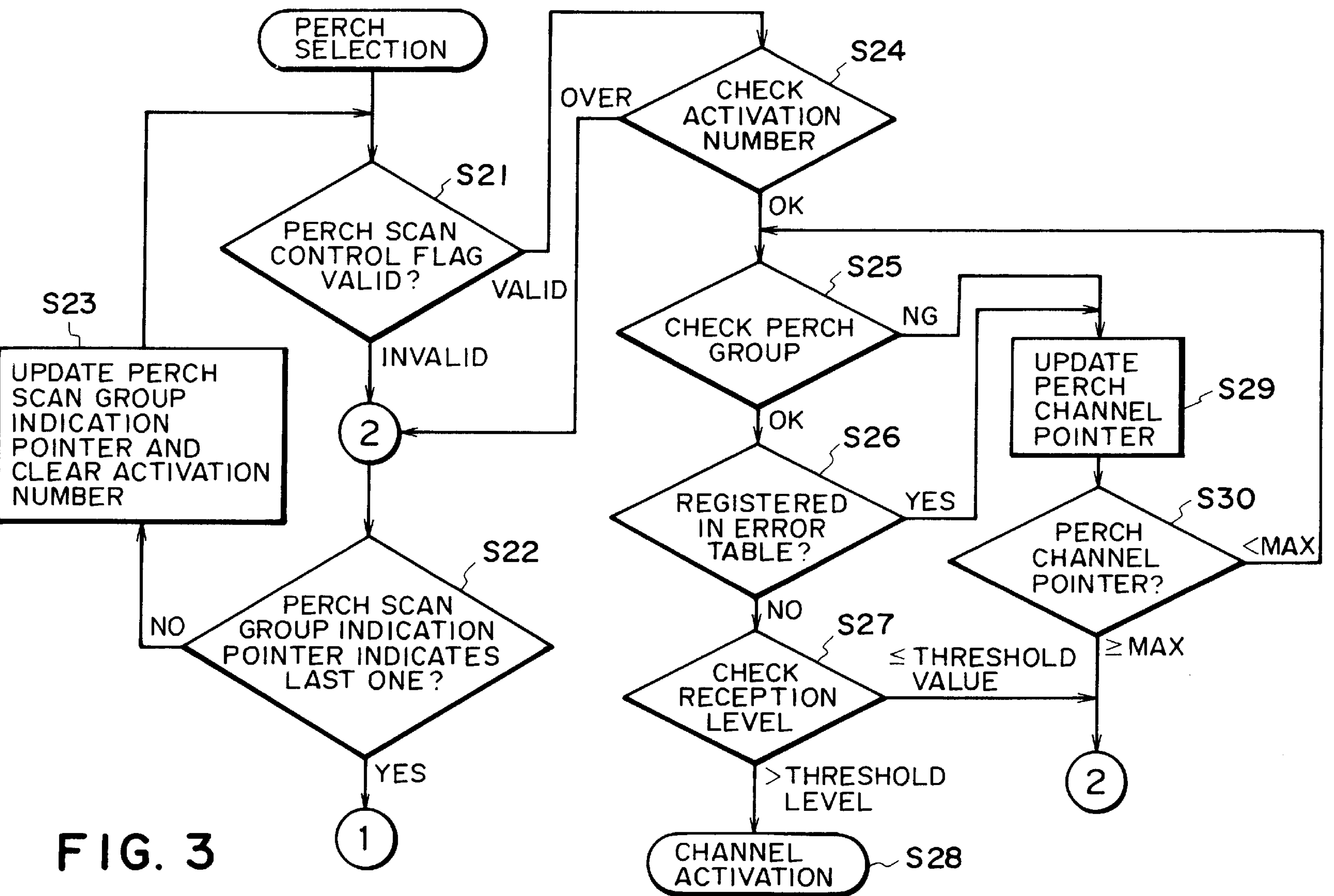
FIG. 3 is a flow chart illustrating the procedure of a perch selection operation of the embodiment.

The procedure of the perch selection operation will be described with reference to FIG. 3. In the perch scan operation, it is judged whether a perch channel control flag is valid or not, i.e., whether the perch measurement site is valid or not (Step S21). If not valid (if invalid), it is judged whether or not a perch scan group indication pointer points the last one (Step S22), and if it points the last one, the flow returns to the process of Step S9 shown in FIG. 1, whereas if not, the perch scan group indication pointer is updated (Step S23) to return to the process of Step S21. Each perch area is constituted by ten perch groups, a home network perch area has ten perch groups, and the perch scan group indication pointer points each group.

If it is judged at Step S21 that the perch scan control flag is valid, the number of activations is checked (Step S24). If the number of activations exceeds a predetermined value (e.g., seven), the flow returns to the process of Step S22, whereas if not, the perch group is checked (Step S25). If the perch group is normal, it is checked whether the perch group has been stored in an error table (Step S26). If not, a reception radio wave intensity (RSSI level) is checked (Step S27), and if the level is a threshold level or smaller, the flow returns to the process of Step S22, whereas if not, the channel activation operation is performed (Step S28).

If at steps S25 and S26 the check result of the perch group is abnormal or the perch group has been stored in the error table, the perch channel pointer is updated (Step S29) and the perch channel pointer is checked (Step S30). If the perch channel pointer is smaller than the maximum value, the flow returns to the process of Step S25, whereas if it is the maximum value or larger, the flow returns to the process of Step S22.

Figure 4A:
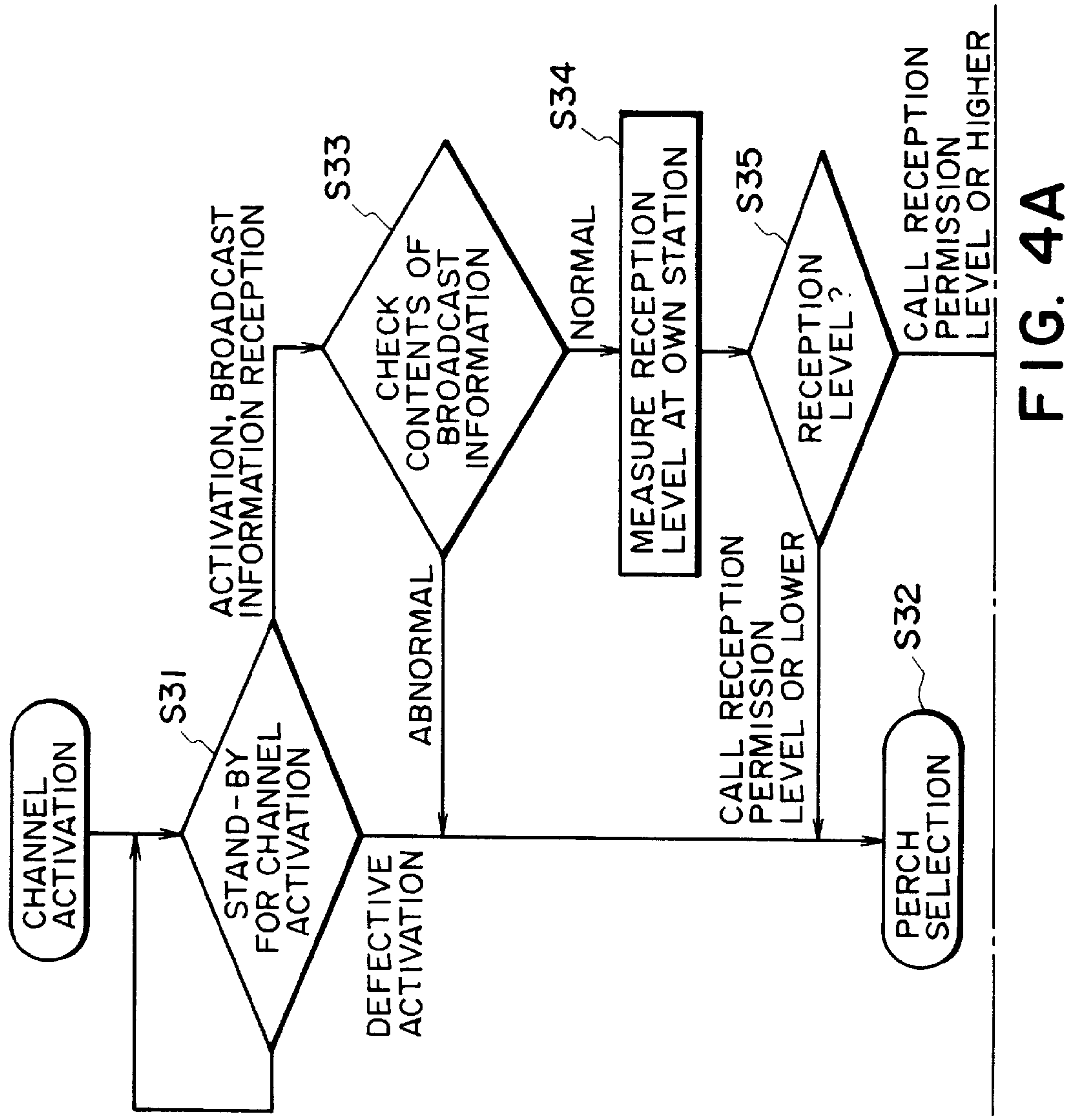
FIGS. 4A and 4B, is a flow chart illustrating the procedure of a channel activation process of the embodiment.
Figure 4B:
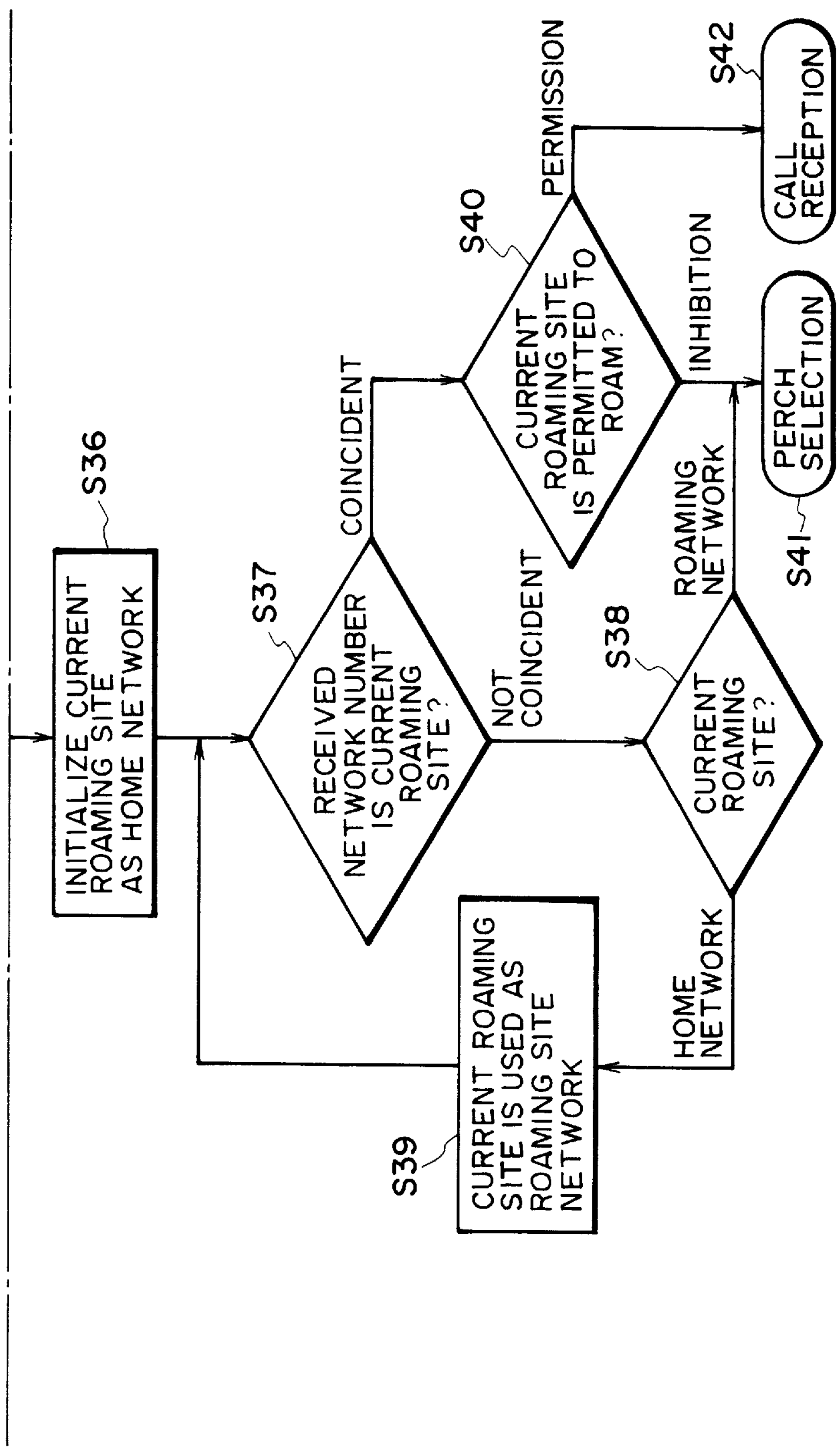

Next, the channel activation process will be described with reference to FIG. 4.

A channel activation is awaited (Step S31). If the activation is defective, the perch selection operation starts (Step S32), whereas if normally activated, the broadcast information is received and the contents thereof are checked (Step S33). If abnormal, the flow advances to Step S35 whereat a perch is selected.

If it is judged at step S33 that the contents of broadcast information are normal, the reception level at its own station is measured at Step S34 and checked at Step S35. If the level is a call reception permission level or smaller, the flow advances to the perch selection process at Step S32. If the level is the call reception permission level or higher, the current roaming is initialized as the home network (Step S36). Next, it is judged whether the received network number coincides with the roaming network number (Step S37). If not coincident, the current roaming is confirmed (Step S38). If the current roaming is the home network, the current roaming is used as the roaming network (Step S39) to return to the process of Step S37).

If it is judged at Step S37 that the received network number is coincident with the roaming network number, it is judged whether the current roaming is permitted to roam (Step S40). If not permitted and inhibited, or if the current roaming is the roaming network at Step S38, the flow advances to the perch selection process (Step S41). If the current roaming is permitted to roam at Step S40, the call reception operation starts at Step S42.

As described so far, according to the roaming control scheme for digital mobile telephones of this invention, a call reception of a mobile telephone and a response of an out-of-network transition can be improved. A call reception time can be shortened by a smooth call reception channel selection. Programs are not required to be generated for each roaming mode and the same programs of a small size can be used.

What is claimed is:

1. A roaming control method for a digital mobile telephone in a call reception control scheme at a home network and a roaming network, comprising the steps of:

a) loading a set of perch channels of the home network and scanning the loaded perch channels to select ones of the perch channels having respective levels of reception radio wave larger than a predetermined level;

b) activating one of the selected perch channels to receive broadcast information of the activated perch channel;

c) deciding whether a network number included in the received broadcast information coincides with a home network number preloaded in the digital mobile telephone;

d) if not coincident in the step c), deciding whether the network number included in the received broadcast information coincides with a roaming network number preloaded in the digital mobile telephone;

e) if coincident in the step c) or d), receiving a call via the perch channel decided as being coincident;

f) if not coincident in the step d), activating another of the selected perch channels to receive broadcast information and re-entering the step c); and g) if it is decided for the selected perch channels that a network number included in any broadcast information does not coincide the home network number or roaming network number, newly loading a set of perch channels of the roaming network and shifting to a mode for successfully searching the perch channels of the roaming network to receive a call.

2. A roaming control method according to claim 1, wherein activation of a perch channel having a level of a reception radio wave larger than the predetermined level is performed in the order of higher level of the reception radio wave.

* * * * *